United States Patent
Pantoja

(10) Patent No.: US 12,532,053 B2
(45) Date of Patent: *Jan. 20, 2026

(54) ONLINE SYSTEM AND METHOD FOR AUTOMATED BREAK DETECTION AND VALIDATION FOR VIDEO CONTENT

(71) Applicant: Paulette Pantoja, Sherman Oaks, CA (US)

(72) Inventor: Paulette Pantoja, Sherman Oaks, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 18/680,503

(22) Filed: May 31, 2024

(65) Prior Publication Data

US 2025/0080811 A1   Mar. 6, 2025

Related U.S. Application Data

(60) Provisional application No. 63/505,702, filed on Jun. 1, 2023.

(51) Int. Cl.
*H04N 21/44*      (2011.01)
*H04N 21/845*     (2011.01)

(52) U.S. Cl.
CPC ........ *H04N 21/8456* (2013.01); *H04N 21/44* (2013.01)

(58) Field of Classification Search
None
See application file for complete search history.

(56) References Cited

U.S. PATENT DOCUMENTS

2017/0371961 A1* 12/2017 Douglas ............... G06F 16/683
2022/0335246 A1* 10/2022 Bin W Mohamad Fablillah ........ G06N 3/09
2024/0373073 A1* 11/2024 Nihei ................ H04N 21/8456

OTHER PUBLICATIONS

Kim, "Robots, artificial intelligence, and service automation (RAISA) in hospitality: sentiment analysis of YouTube streaming data" (Year: 2022).*

* cited by examiner

*Primary Examiner* — Eileen M Adams
(74) *Attorney, Agent, or Firm* — Vitale Vickrey Niro Solon & Gasey LLP

(57) ABSTRACT

An automated detection and selection tool to streamline the process of choosing frame accurate points/markers for any type of audio and visual event is disclosed.

1 Claim, 2 Drawing Sheets

ONLINE SYSTEM AND METHOD FOR AUTOMATED BREAK DETECTION AND VALIDATION FOR VIDEO CONTENT

FIELD OF THE INVENTION

The present invention relates generally to a system and method for detection and validation of break points in video media, such as points in video content for advertisement placement. Specifically, the invention teaches a system and method which optimizes the placement of ad-breaks through a combination of automated cue point detection based upon predetermined detected criteria of video or audio in combination with validation of automated generation of ad break points by comparison against a rule based specification.

BACKGROUND OF THE INVENTION

In the days of the over-the-air broadcasts on a limited number of television channels, video content was tailored to fit a standard time slot (e.g., a 30-minute show) with standard breakpoints in the content for the display of advertisements. A major source of revenue for commercial television broadcasters is the sale of broadcast time to advertisers. Advertising is the main source of income for national television broadcasters and their local over-the-air affiliates. In addition, the public nature of the broadcasts limited the ability of some objectionable content according to the regulations of FCC or other similar rules.

With the development of alternative streaming channels (e.g., online video channels such as YouTube and others), the standardization of content format has lessened or ceased. Moreover, such venues are not subject to the same kind of content regulation as over-the-air channels. Perhaps most important, the lack of any standardization of content has in turn led to lack of standardization for the placement or timing of advertisements.

Some related problems exist relative to the advertising and utility of such content, too. Namely, having such new content formatting creates a need for easier ways to access chapter points, credit sequence or other miscellaneous markers for playback. Likewise, certain content forms (e.g., sporting events, award shows, etc.) would benefit from the ability to select certain content (e.g., key moments or "hero shots") to jump to or use in highlights.

SUMMARY AND OBJECTS OF THE INVENTION

It is an object of embodiments of the present invention to provide a system that allows for Full cloud-based application. An intuitive, automated detection and selection tool to streamline the process of choosing frame accurate points/markers for any type of audio and visual event.

Another object of the present invention is to provide a system and method for finding frame accurate event breaks to insert advertising, including the use of automated rules to implement such a process.

Still another object of the present invention is to provide a system and method to enable markers, including chapter points, credits in/out and other similar markers for playback.

Yet another object of the present invention is to provide a system and method to enable content moderation through the quick finding of specific event types (e.g., violence, adult content, etc.).

A further object of the present invention is to provide a system and method to enable the quick and effective selection of highlights (e.g., key moments and/or "hero shots") from content such as sporting events, awards shows and the like.

The system of the present invention typically includes one or more client computers which generates or accepts profiles from a server via cloud-based application to operate upon data from the review of video content by a commercially available artificial intelligence ("AI") engine to enable the creation of automated cue points, as well as cue point review and validation, and other advanced control features. The system can then provide the resulting output in a variety of output formats (e.g., timecode, meditime, frames or the like) for subsequent use by the client or viewer.

Other features and advantages of the present invention will be apparent from the accompanying drawings and from the detailed description that follows.

BRIEF DESCRIPTION OF THE DRAWINGS

The present invention is illustrated by way of example and not limitation in the figures of the accompanying drawings in which like references indicate similar elements, and in which.

DESCRIPTION OF THE PREFERRED EMBODIMENTS

In the following description, for purposes of explanation, numerous specific details are set forth in order to provide an understanding of the present invention. It will be evident, however, to one skilled in the art that the present invention may be practiced without certain specific details. In other instances, well-known structures and devices are shown in block diagram form to facilitate explanation. The description of preferred embodiments is not intended to limit the scope of the claims appended hereto. In addition, future and present alternatives and modifications to the preferred embodiments described below are contemplated. Any alternatives or modifications which make insubstantial changes in function, in purpose, in structure, or in result are intended to be covered by the claims of this patent.

Figure 1:
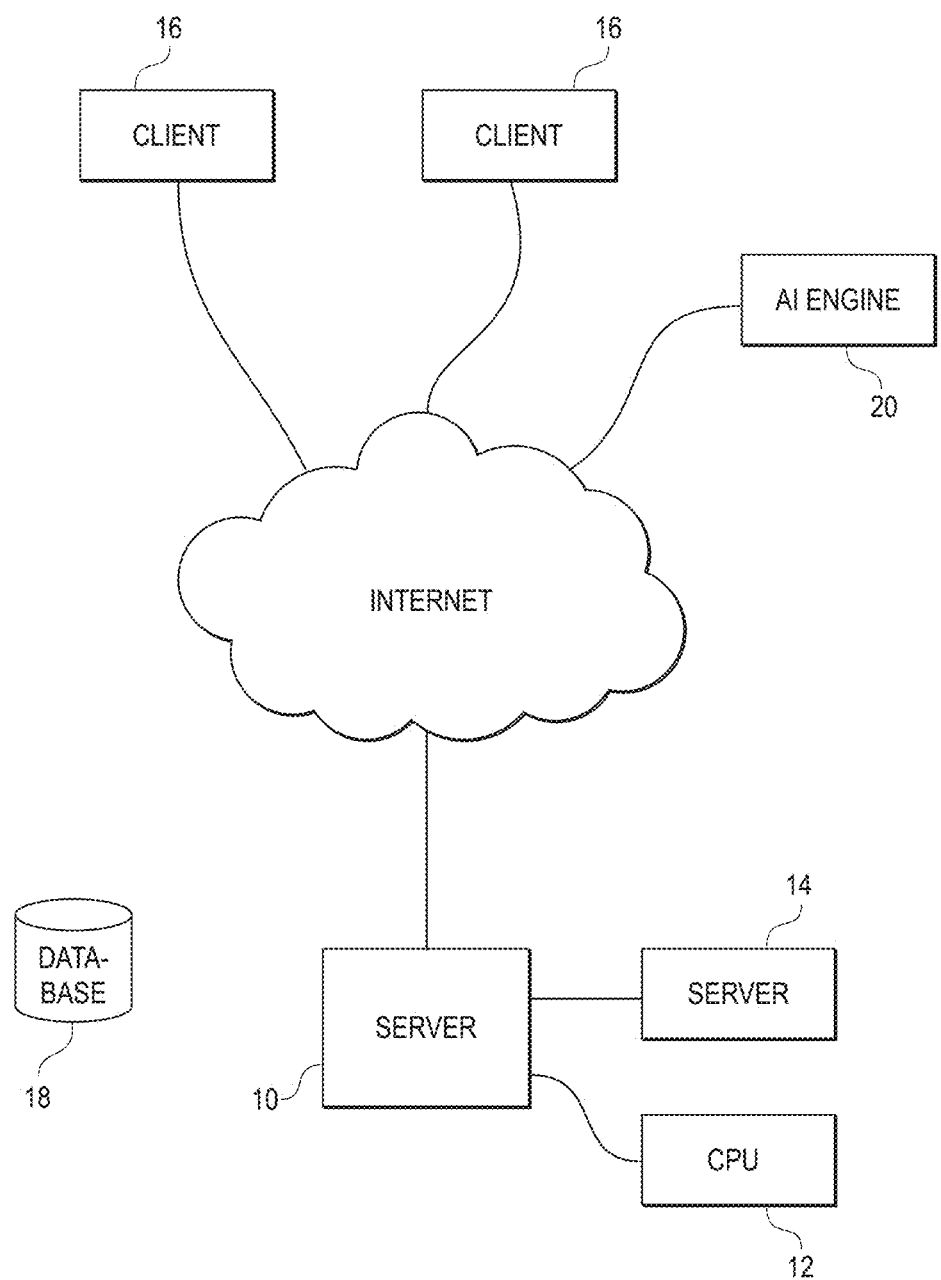
FIG. 1 illustrates a computer network that includes client computers coupled to a server computer, and that is used to implement embodiments of the present invention.

As shown in FIG. 1, the system embodiments of the present invention may be implemented on one or more computers comprising a computer network. According to one embodiment of the present invention, a server computer 10 transmits and receives data over a computer network. The steps of accessing, downloading or uploading, and manipulating the data, as well as other aspects of the present invention are implemented by a central processing unit (CPU) 12 in the server computer 10 executing sequences of instructions stored in a memory 14. The memory may be a random access memory (RAM), read-only memory (ROM), a persistent store, such as a mass storage device, or any combination of these devices. Execution of the sequences of instructions causes the CPU to perform steps according to embodiments of the present invention.

Information may be uploaded or input into to the server computer 10 from one or more other computer systems over a network connection. For example, a client computer 16 may transmit data to the server computer in order to enable cue point detection and validation. As the server receives the uploaded video or input over the internet or other network connection, e.g., data from an artificial intelligence ("AI") engine 20, it stores the information in memory 14. The server may also store the information for updating a database 18, and it may automatically output (or direct the output) of video content or related information to one or more client computers 16 depending upon the nature of the information the server computer 10 receives. In some cases, the event information may be executed by the CPU, and may also be executed by the CPU in conjunction with a rule set (not shown) that interprets the input and forwards certain information to display on a given client computer depending upon the rule sets or profiles selected by various client computers and/or the selection by various clients to receive such automatic notification. Thus, the present invention is not limited to any specific combination of hardware circuitry and software, nor to any particular source code for the instructions executed by the server or client computers.

Information may be uploaded or input into to the server computer 10 from one or more other computer systems over a network connection. For example, a client computer 16 or an AI engine 20 may transmit data to the server computer in response to video being analyzed for detecting objects or scenes in audio-video content provided to it. As server 10 receives the upload or input over the network/internet connection, it stores the information in memory. The server 10 may store the information for updating a database 18 in memory 14, and it may automatically output analysis to one or more client computers 16 depending upon the nature of the information the server computer 10 receives. In some cases, the event information may not be directly executable by the CPU 12, and may instead be executed by a rule set (not shown) that interprets the input and forwards information to select client computers 16 depending upon the rule sets or profiles employed by various client computers. In other embodiments, hardwired circuitry may be used in place of, or in combination with, software instructions to implement the present invention. Thus, the present invention is not limited to any specific combination of hardware circuitry and software, nor to any particular source code for the instructions executed by the server or client computers.

Figure 2:
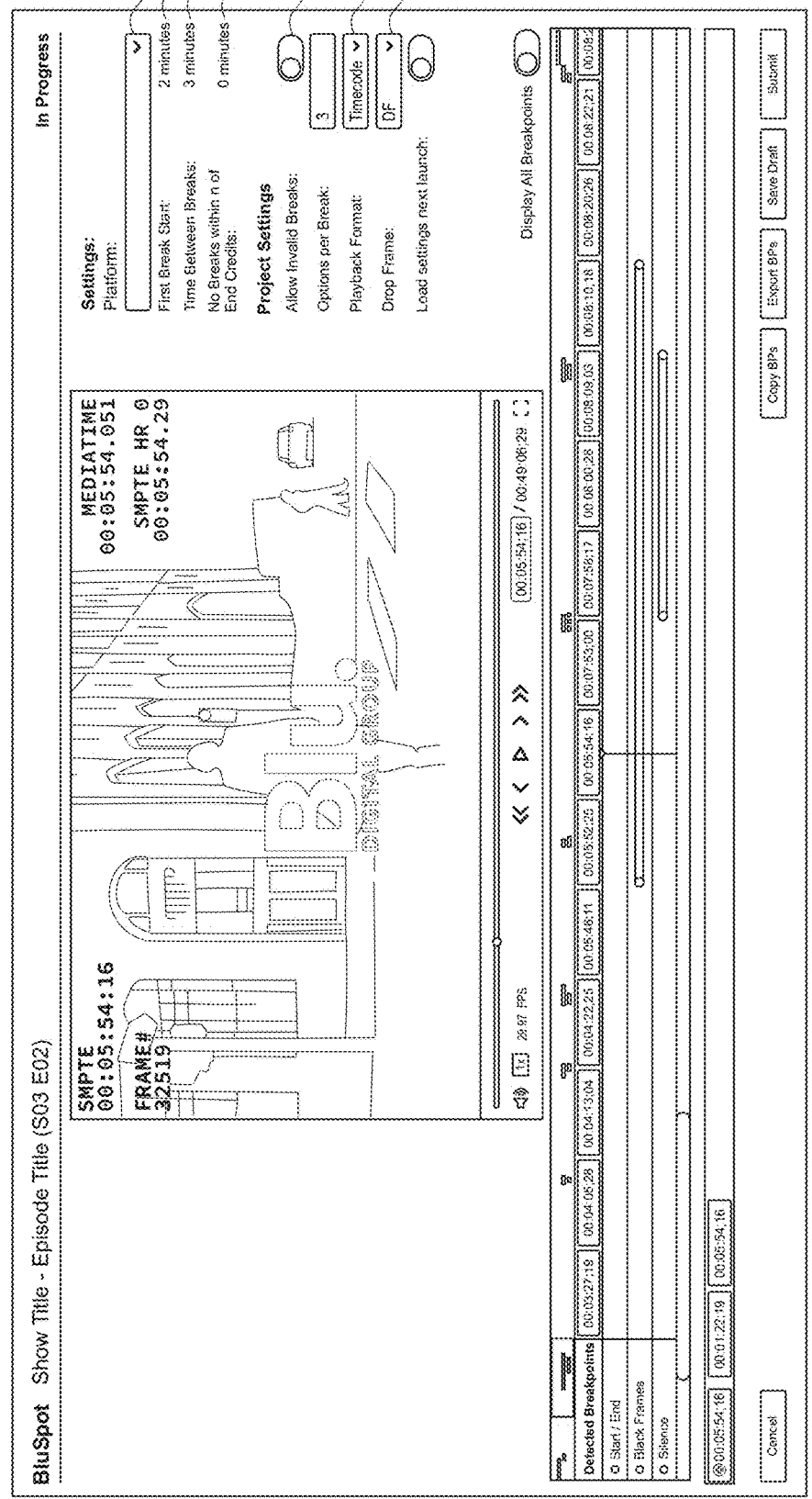
FIG. 2 is an example graphic user interface for a client or operator accessing the computer network that implements embodiments of the present invention.

FIG. 2 shows a graphic user interface for various client computers. Prior to accessing this GUI, the client would be expected to provide an identification and password to a login screen (not shown) to maintain the security of the computer network. Once the password and login have been validated by the server computer, the server enables a client GUI 40 to be displayed to a client computer 16. The client GUI 40 includes a series of input points/pulldown menus for settings which allow the automatic detection and selection tool which allow the automated process of choosing frame accurate markers for any type of audio and visual event based upon a number of criteria, such as platform 42, first break start 44, time between breaks 46, and a limit on proximity of breaks to end credits 48. In this way, the system uses pre-defined (or custom) specifications to exclude unwanted detected cue points and validate user selections for accuracy. Such general settings can be controlled by the operator at client computer 16 by creating unique profiles based upon platform requirements and/or client preference, or the operator can simply employ predetermined profiles/rule sets maintained in memory 14 (which may also be stored on the client computer 16).

In addition, the client GUI can include project settings for a given video content being processed, including an option to allow "invalid" breaks 52 (e.g., breaks which might otherwise violate rule sets for the timing or location of breaks), playback format 54 and drop frame/non-drop frame selection 56. Thus, the system provides users the alternative to have full creative control to manually override the system's selections. These features also allow users to mark additional supporting cue points such as intro credits, end credits, or custom-defined values.

Furthermore, the client GUI 40 include one or more bars 60 detected identifying detected breakpoints, including a graphical representation of detected breakpoints/cue points, such as identification of specifically detected start/end points, black frames and/or silence detected in the video being operated upon. Those of ordinary skill in the art having the teaching of the present invention and an understanding of html or similar programming will understand how to enable the pull down menus and input boxes of the client GUI 40. In response to such detected breakpoints/cue points, the profile/rule set will automatically select cue points, e.g., breakpoints for insertions of advertisements or announcements based upon detected levels of video "black," silence and/or scene changes. The comparison of such cue points against the rules or profile of the user as stored in memory 14 will thus cause the exclusion of cue points which do not comport with the rules stored in memory, e.g., a cue point identified in the first minute of a video may not be validated if it the user profile/rule set specified that the first break start point must be at least two minutes into the video. In such an event, the cue point thus identified would be excluded from the final processed video.

As a separate but complementary feature, the AI engine (such as the Rekognition AI engine provided by Amazon) can further enhance the capability of the rule set by performing detection capabilities of the video content e.g, adult content, violence, drugs & alcohol, etc.) for performing content moderation.

Still another separate feature of the system enables advanced controls for playback of the video being processed. Namely, the system includes NLE (non-linear editing) playback controls, as well as framerate control for any common framerate, clickable timecodes shuttle the player to the correct review point (such as the user clicking upon one or more of the bars 60) and playback speed control (with audio scrubbing).

Once the cue points/break points have been identified, the processor 12 can thus provide the video output containing the verified cue points with a timecode, frame number, and/or watermark burn-in (or custom burn-in). The system also enable exporting timecode values in multiple formats, including timecode (HH:MM:SS:FF), media time (HH:MM:SS.mmm), milliseconds, seconds, seconds.milliseconds, and frames. Once the video is has such validated cue points and is stamped, the user can then transfer or send the now processed video to user computer 16 or some other memory containing device for subsequent review and processing, as may be needed.

In the foregoing, a system has been described for automated cue point detection, advanced control features, and efficient marker selection capabilities make it a valuable tool for streamlining the audio and visual event selection process. The present invention has been described with reference to leveraging advanced commercially available AI engines such as Amazon's Rekognition provides accurate and reliable results for cue point/break points, improving efficiency and productivity for businesses and individuals involved in audio and video production. However, it will be evident that various modifications and changes may be made to these embodiments without departing from the broader spirit and scope of the invention as set forth in the claims.

Accordingly, the specification and drawings are to be regarded in an illustrative rather than a restrictive sense.

What is claimed is:

1. A system for editing a piece of audio video content to provide a plurality of cue points based upon a rule set, said system comprising:
   a) memory, the memory including a rule set for verifying cue points;
   b) a server connected to the memory, the server capable of receiving inputs from a plurality of remote third party client computers;
   c) an artificial intelligence engine for analyzing the piece of video content so as to identify events within the audiovideo piece content that include at least one content break from the group consisting of video black, silence, and scene changes;
   d) a CPU for generating cue points within the audiovideo piece content based upon the events identified by the artificial intelligence engine, and further verifying the validity of such cue points by comparing their location within the piece of audio video content with the rule set, excluding the cue points which violate the rule set, and marking the audiovideo piece with a timecode or frame numbers so as enable the identification of the valid cue points; and
   e) a second memory for storing the audiovideo piece with the verified cue points.

* * * * *